Patented Dec. 23, 1952

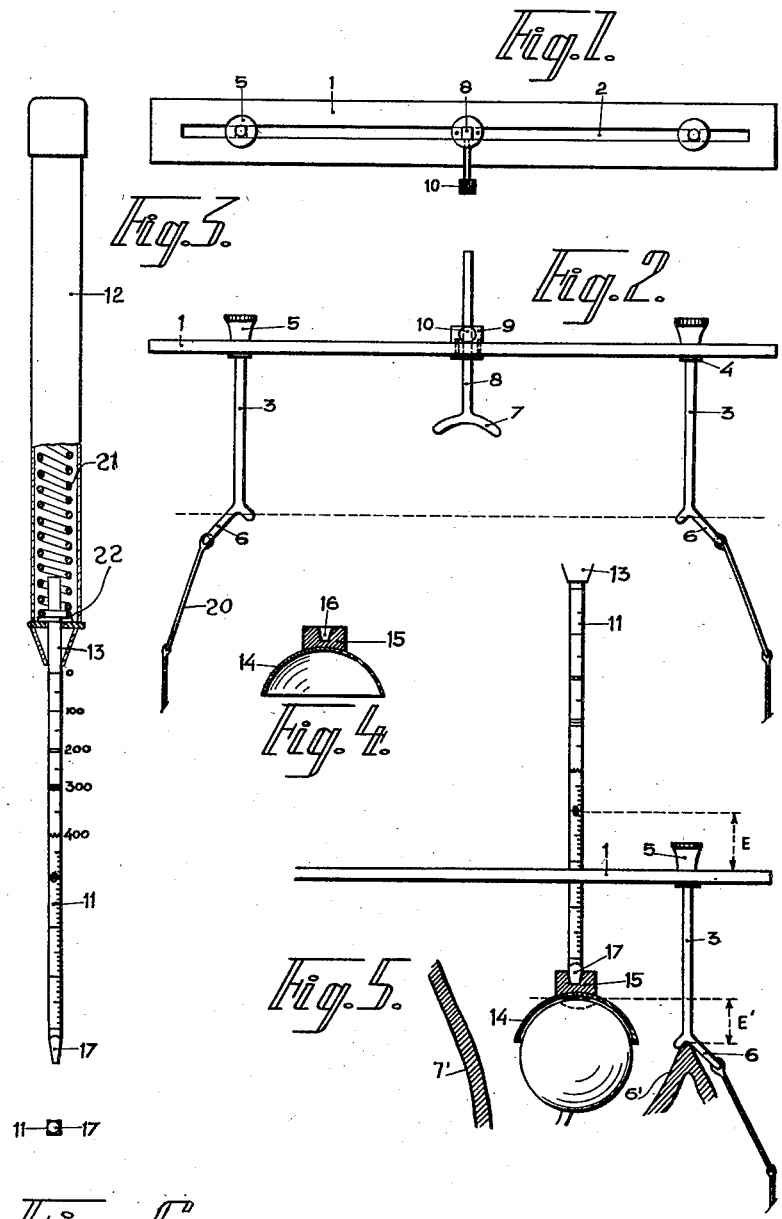

2,622,439

UNITED STATES PATENT OFFICE 2,622,439

ORBITAL TONOMETER

Adrianus Cornelis Copper, Leyden, Netherlands

Application November 9, 1949, Serial No. 126,418
In Great Britain November 19, 1948

1 Claim. (Cl. 73—80)

This invention relates to an orbital tonometer, one of the objects being to provide a simple, convenient and reliable instrument for measuring the resistance encountered in forcing the eyeball back into the orbit or eye socket, such resistance affording the oculist data concerning the consistency and other qualities of the intra-orbital tissues.

According to the present invention an orbital tonometer for the purpose referred to comprises a bridge to extend across the front of the patient's face, bases to rest upon the patient's outer orbital margins to locate the bridge, and dynamometer means adapted to exert a force on the eyeball and measure such force and to indicate, in relation to the bridge, the displacement of the eyeball under such force.

Since the displacement of the eyeball under a backward pressure not only depends on the consistency of the intra-orbital tissues but also on their volume, i. e. the space around and behind the eyeball, it is theoretically desirable that the measurement of this displacement should be combined with a measurement of the volume of the intra-orbital tissues. In practice the latter is not possible. However, the axial position of the eyeball in the orbital entrance, i. e. the degree of exophthalmos or protrusion of the eye, is a useful indication of the volume of the tissues behind the eyeball. A further object of the present invention is to provide an instrument enabling both the degree of exophthalmos or protrusion of the eye and the axial displacement of the eye resulting from an external force to be conveniently measured.

To this end according to one form of the invention the upper surface of the bridge cooperating with the dynamometer means is at an invariable fixed distance from the line passing through the bases.

The invention may be carried into practice in various ways, but one specific construction will be described by way of example with reference to the accompanying drawings, in which:

Figure 1 is a plan view of the supporting bridge when in the position of use in which the patient is lying back and looking upwards, Figure 2 is an elevation of the supporting bridge, Figure 3 is an elevation of the dynamometer partly in section, Figure 4 is a diagrammatic section of the eye cup, Figure 5 is a diagram similar to part of Figure 2 but including a portion of the dynamometer and indicating the eyeball and edges of the orbit of the patient to indicate the manner in which a reading is taken, and Figure 6 is an end view of the rod 11 and tip 17 on Figure 3.

As indicated in Figures 1 and 2, the bridge consists of a cross bar in the form of a flat metal strip 1 having a continuous longitudinal slot 2 in which are clamped two metal stays 3 of fixed length. Each stay has at one end a shoulder 4 abutting the lower face of the strip and a threaded portion (not shown) extending through the slit and carrying a nut 5 by which it can be clamped at any desired position of adjustment along the slit depending upon the spacing between the patient's outer orbital margins. At its other end each stay is provided with a base 6 shaped to fit the outer orbital margin 6' as indicated in Figure 5.

Between the two stays 3 the bridge carries a nose piece comprising a curved base 7 attached to a rod 8 projecting through a short flanged sleeve 9 arranged to slide in the slit 2 and provided with a clamping screw 10 for enabling the nose piece to be clamped in any position of adjustment. A headband 20 serves to hold the frame in position on the patient's head.

As shown in Figure 3 the dynamometer comprises a stem in the form of a rod 11 of square cross section arranged to slide longitudinally in a tubular handle 12 within which a spring 21 is provided, between the bottom of said tubular handle and a collar 22 on said rod so as to resist inward movement of the rod. On one face of the rod 11 are marked two scales, one directly above the other. The lower scale is calibrated in terms of length, for example in millimetres, and as indicated it has its zero mark a short distance from its upper end as referred to later. The upper scale, for which the lower edge of the conical lower end 13 of the tubular handle provides an index, is calibrated in terms of force, for example in grams. Due to the close proximity of the two scales it is quite easy to read both simultaneously.

The eye cup employed in conjunction with the dynamometer is indicated in cross section in Figure 4 and consists of a thin walled cup 14 conveniently composed of a transparent plastic and a central boss 15 having in it a socket 16 within which the reduced end 17 of the dynamometer stem 11 is a loose fit.

Since the eye cup is separate from the dynamometer stem a number of eye cups of different sizes and curvatures can be provided and an appropriate one chosen to fit each particular eye, thus improving the accuracy of the measurement. In addition the use of a separate eye cup enables the stem of the dynamometer to be freely passed through the slit 2 of the bridge so that there is no necessity for a transverse slot in the bridge to enable the dynamometer stem to be introduced, which would reduce the strength of the bridge.

The avoidance of a transverse slot also tends to make it easier for the patient to look directly forward through the longitudinal slot without any tendency for the eye to be deflected.

Figure 5 diagrammatically indicates the application of the instrument to one eye, only one end of the bridge being shown.

The bridge is placed with the bases 6 of the stays 3 resting on the outer orbital margins 6' and the nose piece 7 on the nose 7' and is held in place by the headband 20. An eye cup 14 of proper size is then placed on the anaesthetised eye and the eye is given time to relax. The stem of the dynamometer is then passed through the slit 2 till its end 17 rests in the socket 16 of the eye cup. As it is a loose fit small involuntary movements of the dynamometer are not directly communicated to the eye.

If no force is exerted the distance E in Figure 5 represents the degree of exophthalmos, since the zero mark of the length scale is so arranged that this distance E is equal to the protrusion of the eye beyond the outer orbital margin, marked E' in Figure 5. It is clear that in order to ensure this the length of the stays 3 must remain unaltered, or if a zero adjustment is provided it must be clamped at the proper setting and thereafter remain undisturbed.

When a force is exerted through the dynamometer the distance E decreases indicating the rearward displacement of the eye and readings can be taken of the reduced value for various values of the force. As previously indicated, the close proximity of the force scale to the displacement scale enables corresponding readings to be readily taken.

It will be appreciated that the invention is not limited to the details of the construction described by way of example. Thus the nose piece is not essential although it tends to steady the bridge and prevent it from tilting. Again other arrangements of the scales may be employed although it is important that the force and displacement scales should be close to one another so that they can be read simultaneously. The form of bridge may also be varied although the form described has the advantage of simplicity and enables the stays 3 to be readily adjusted and the dynamometer to be inserted at any desired position.

I claim:

An orbital tonometer comprising a strip, a pair of stays of fixed length mounted on said strip for adjustment lengthwise thereof, a base formed on the free end of each stay to rest on the patient's outer orbital margins, to locate the instrument, a rod adapted to be passed through an opening in said strip and to be located in line with the eye to be tested, an eyecup to be placed on the eyeball in line with said rod at one end thereof, a tubular handle slidably mounted on said rod at the opposite end thereof, spring means within said handle and acting on said rod to resist movement of said handle relative to said rod in a direction towards said first mentioned end, thereby to exert pressure on the eye through said rod and said eyecup, a force indicating scale on said rod in a position to cooperate with an index associated with said handle for measuring such force and a scale of length graduations on said rod to cooperate with a fixed index associated with said strip for measuring the displacement of the eyeball under such force.

ADRIANUS CORNELIS COPPER.

REFERENCES CITED

The following references are of record in the file of this patent:

UNITED STATES PATENTS

| Number | Name | Date |
|---|---|---|
| 1,291,050 | McLean | Jan. 14, 1919 |
| 1,842,323 | Gluzek | Jan. 19, 1932 |
| 1,922,895 | Lemaire | Aug. 15, 1933 |
| 2,130,751 | Van Der Meer | Sept. 20, 1938 |
| 2,256,491 | Peck et al. | Sept. 23, 1941 |
| 2,314,514 | Parsons | Mar. 23, 1943 |

FOREIGN PATENTS

| Number | Country | Date |
|---|---|---|
| 5,356 | Great Britain | 1911 |